United States Patent
Sobolewski et al.

(10) Patent No.: US 12,492,540 B2
(45) Date of Patent: *Dec. 9, 2025

(54) AUTOMATIC DRAIN VALVE

(71) Applicant: B/E Aerospace, Inc., Winston Salem, NC (US)

(72) Inventors: Filip Sobolewski, Wieluń (PL); Iwona Herbik, Odolanow (PL); Łukasz Sędlak, Miłochowice (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/484,946

(22) Filed: Oct. 11, 2023

(65) Prior Publication Data
US 2024/0125102 A1   Apr. 18, 2024

(30) Foreign Application Priority Data
Oct. 14, 2022   (EP) .................... 22461621

(51) Int. Cl.
| | | |
|---|---|---|
| *E03D 1/34* | (2006.01) | |
| *B64D 11/02* | (2006.01) | |
| *G05D 9/02* | (2006.01) | |

(52) U.S. Cl.
CPC ............. *E03D 1/34* (2013.01); *B64D 11/02* (2013.01); *G05D 9/02* (2013.01)

(58) Field of Classification Search
CPC ........................................................ E03D 1/34
See application file for complete search history.

(56) References Cited

U.S. PATENT DOCUMENTS

| | | |
|---|---|---|
| 3,695,284 A | 10/1972 | Wallgren |
| 4,376,315 A | 3/1983 | Badger et al. |
| 5,232,010 A | 8/1993 | Rozenblatt et al. |
| 6,732,386 B2 | 5/2004 | Anderson et al. |
| (Continued) | | |

FOREIGN PATENT DOCUMENTS

| | | |
|---|---|---|
| EP | 2557344 A1 | 2/2013 |
| JP | S5917078 B2 | 1/1984 |

OTHER PUBLICATIONS

Abstract for JPS5917078A, Published: Jan. 28, 1984, 1 page.
European Search Report for Application No. 22461621.9, mailed Mar. 27, 2023, 9 pages.

*Primary Examiner* — Christine J Skubinna
(74) *Attorney, Agent, or Firm* — CANTOR COLBURN LLP

(57) ABSTRACT

A drain valve assembly includes a valve housing having an upper section and a lower section and a poppet valve positioned in the housing and extending between the lower section and the upper section. The poppet valve is arranged to fluidly seal the lower section from the upper section, the poppet valve in the water collection chamber being arranged to be normally sealingly positioned across the outlet port to prevent water exiting the water collection chamber to the outlet port. The poppet valve is attached to the pressure diaphragm in the upper section. The drain valve assembly also includes a pressure line for providing a pressure signal to the upper section such that when the pressure from the pressure line in the upper section exceeds a predetermined opening pressure it causes the pressure diaphragm to lift.

13 Claims, 4 Drawing Sheets

(56) References Cited

U.S. PATENT DOCUMENTS

| | | |
|---|---|---|
| 9,422,706 B2 | 8/2016 | Hoang et al. |
| 9,657,473 B2 * | 5/2017 | Namer .................... F16B 21/02 |
| 9,951,504 B2 * | 4/2018 | Hoang .................... E03D 11/16 |
| 2006/0219966 A1 | 10/2006 | Zecchi et al. |
| 2009/0065073 A1 * | 3/2009 | Davis ................. F16K 31/1262 |
| | | 137/505.36 |
| 2017/0320577 A1 | 11/2017 | Lutzer et al. |

* cited by examiner

AUTOMATIC DRAIN VALVE

CROSS REFERENCE TO RELATED APPLICATIONS

This application claims priority to European Patent Application No. 22461621.9 filed Oct. 14, 2022, the entire contents of which is incorporated herein by reference.

TECHNICAL FIELD

The present disclosure is concerned with an automatic flow control valve for example a pressure-controlled drain valve for a water system such as, but not exclusively, a vacuum toilet of the sort commonly used in aircraft, vehicles etc.

BACKGROUND

Vacuum water systems such as toilets or wash basins are used in e.g. trains, aircraft and other vehicle sanitation systems, and may also find application in other sanitation systems such as in temporary buildings or venues. Such pressure-controlled valves find use, for example, in systems in which water from one part of the system can be drained from the system or released into another part of the system. For example, drinking water or water from a wash basin, that is released into a waste pipe can be drained from the aircraft via a drain mast. Alternatively, in some systems, this water can be re-used for flushing a toilet. Such re-usable water is known as 'grey water'. Drain valves are not only used for controlling the flow of grey water; they may be used to control the flow of any water where it is desired to release a collected body of water.

Vacuum toilets include a number of valves. A rinse valve is provided to release rinse fluid from a reservoir into the toilet bowl when the flush is activated. The rinse fluid in the reservoir may be grey water from e.g. a wash basin, as known in the art. A flush valve is provided at the bottom of the toilet bowl and is activated in synchrony with the rinse valve, to open to evacuate the rinse fluid and waste from the bowl, by vacuum, to a waste tank. A drain valve is provided to empty the waste tank via the drain mast, as desired.

Vacuum toilets may also be provided with an overflow outlet to convey water from the bowl to the waste line in the event that the water level in the bowl becomes too high due to e.g. a blockage in the toilet. In some cases, e.g. due to a faulty rinse valve that continues to leak or drip rinse fluid into the toilet bowl even though the flush (and hence the flush valve) has not been activated, the level of water in the toilet bowl can rise and, particularly during less busy times e.g. at night, when the toilet is not being used often, this can cause the bowl to overflow. Flooding of the toilet bowl is unpleasant for users and crew and can adversely affect hygiene on the aircraft.

Whilst drain valves are known, as mentioned above, these will not always operate reliably to prevent such overflow. Typically, the force to open the valve is from the hydrostatic pressure of the collected water. Because there is a high spread of vacuum levels on the outlet side of the valve, depending on ambient conditions, the opening force needs to be variable and also relatively high. A high opening force requires a large head of water on the collection side. Whilst in some applications, the space to ensure a high head of water may not be a problem, there are many applications where space is limited, such as in aircraft lavatories, and so it is not possible to create a high enough force to open the drain valve.

There is, therefore, a need for an automatic drain valve, for draining water from an overfull toilet bowl, that will not need to create a variable and high valve opening force, and can operate on low magnitude and virtually constant opening force, regardless of the vacuum level and without the need for the space for a large head of water.

SUMMARY

According to the disclosure, there is provided a drain valve assembly comprising: a valve housing having an upper section and a lower section, the lower section comprising an inlet port and an outlet port and a water collection chamber between the inlet port and the outlet port, the upper section including a pressure diaphragm across the upper section, the drain valve assembly further including a poppet valve positioned in the housing and extending between the lower section and the upper section, the poppet valve arranged to fluidly seal the lower section from the upper section, the poppet valve in the water collection chamber being arranged to be normally sealingly positioned across the outlet port to prevent water exiting the water collection chamber to the outlet port, the poppet valve attached to the pressure diaphragm in the upper section, the drain valve assembly further comprising a pressure line for providing a pressure signal to the upper section such that when the pressure from the pressure line in the upper section exceeds a predetermined opening pressure it causes the pressure diaphragm to lift and to thus lift the poppet out of sealing engagement across the outlet port such that water can drain to the outlet port from the water collection chamber; wherein the poppet valve has a hollow body defining a channel from a first end of the poppet valve, adjacent the outlet, and a second end of the poppet valve adjacent the pressure diaphragm, and wherein the housing defines a vacuum cavity across the second end of the channel, such that a negative pressure acting on one end of the poppet valve is balanced by a negative pressure acting in the opposite direction at the other end.

A toilet system, e.g. for an aircraft, incorporating such a drain valve assembly is also provided

BRIEF DESCRIPTION OF THE FIGURES

Examples of a drain valve assembly according to the disclosure will now be described with reference to the drawings. It should be noted that these are examples only and that variations are possible within the scope of the claims.

DETAILED DESCRIPTION

To aid in the explanation of the drain valve assembly according to the disclosure, a conventional vacuum toilet system will first be briefly described with reference to FIG. 1.

Figure 1:
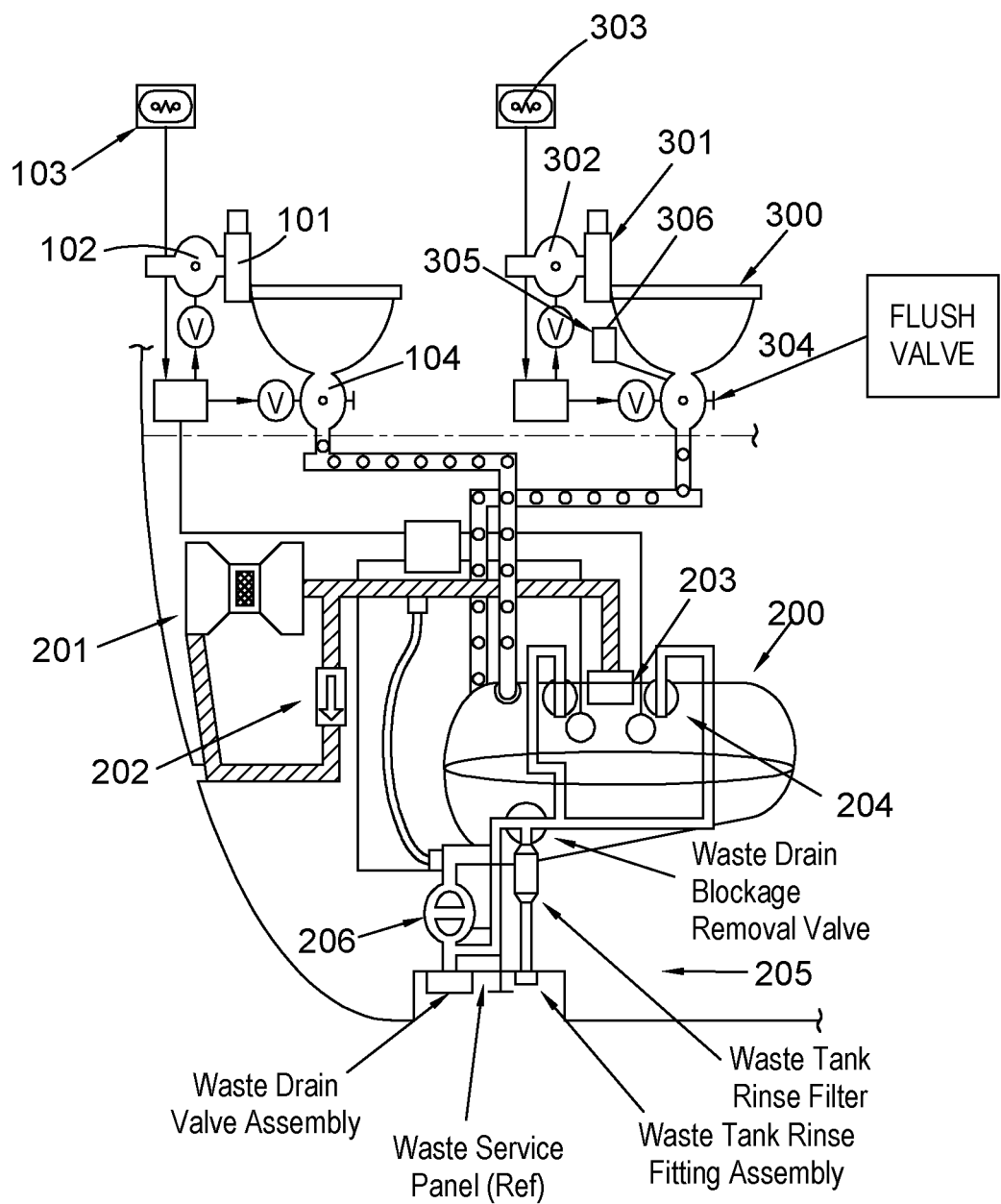
FIG. 1 shows, on the left-hand side, an example of a vacuum toilet system as known in the art and, for comparison, on the right-hand side a vacuum toilet system incorporating a drain valve in accordance with this disclosure.

FIG. 1, on the left-hand side, shows a vacuum toilet bowl 100 to which is fluidly connected a rinse fluid reservoir 101 regulated by a rinse valve 102 which is opened when a flush switch 103 is operated by a user. Pressing, or otherwise activating the flush switch 103 opens the rinse valve 102 to release rinse fluid from the reservoir 101 into the toilet bowl. At the same time, or very shortly thereafter, a flush valve 104 at the bottom of the toilet is caused to open. The flush valve 104 connects the toilet bowl 101 to a waste tank 200 to which a vacuum is applied via a vacuum blower and filter 201 and a vacuum check valve 202. The vacuum causes the rinse fluid and any waste material in the toilet bowl to be evacuated from the toilet bowl into the waste tank 200. The waste tank 200 may be provided with a liquid separator 203, one or more rinse nozzles 204 for cleaning the tank, and a waste tank drain system 205 including a drain valve 206 for emptying the contents of the waste tank to a drain mast (not shown) The waste tank as shown and described above is by way of example only and the waste drained from the toilet bowl via the flush valve may be processed in other ways.

As described above, there is a risk that in certain conditions, the toilet bowl may overflow.

Figure 2:
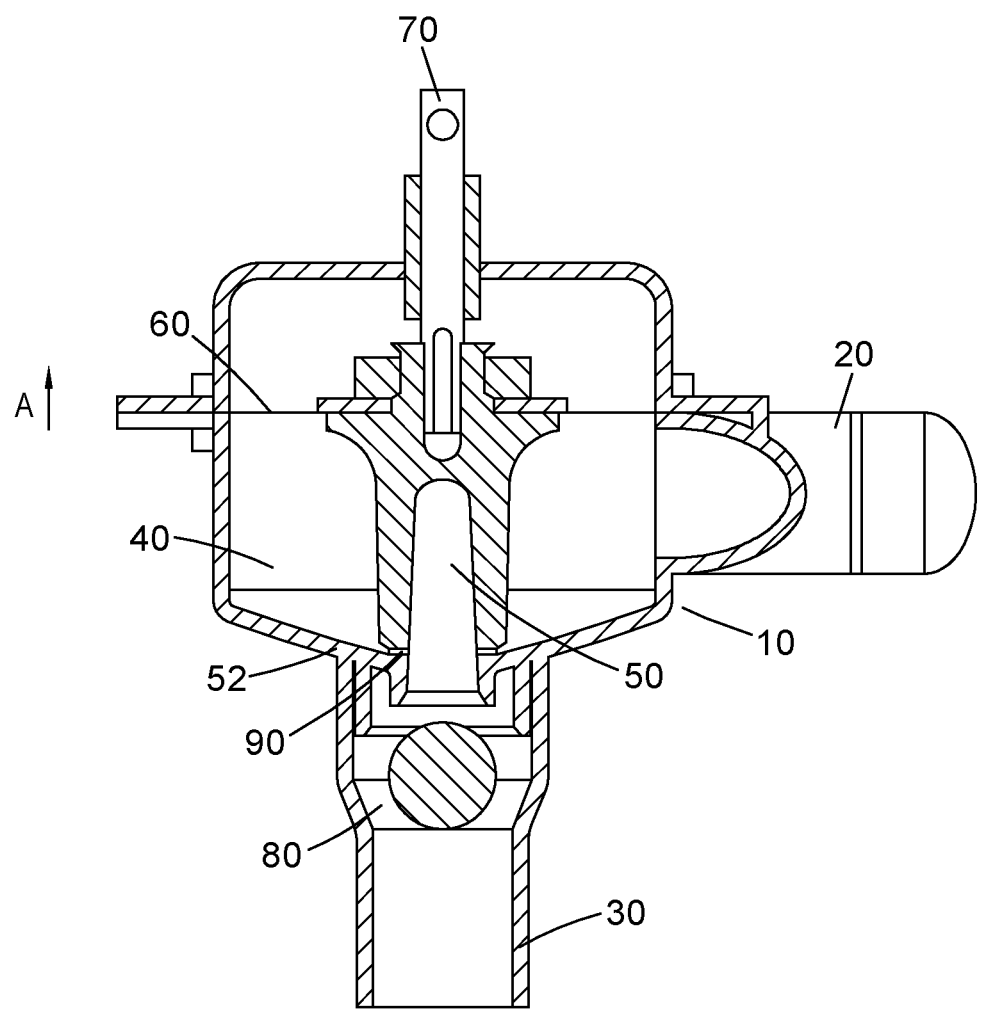
FIG. 2 shows a cross-section of a drain valve assembly as known in the art.

By way of background, one known type of normally open valve is shown in FIG. 2 and is described briefly below. The assembly comprises a housing 10 having an inlet port 20 and an outlet port 30. The inlet port is connected to the source of water to be drained or re-directed. In normal operation, water from the inlet port 20 is collected in a reservoir 40. The fluid flow path from the reservoir to the outlet port 30 is blocked by a normally-closed poppet valve 50 that sits in a valve seat 52 formed in the lower part of the housing providing a fluid path to the outlet port. In the closed position, the poppet valve 50 is located in the valve seat 52 thus closing off flow from the reservoir 40 to the outlet port 30. A seal e.g. a gasket seal 90 seals the flow path when the valve is closed. A check valve 80 may be provided in the outlet port 30 to prevent backflow from the outlet port into the reservoir 40. A diaphragm 60 across the top of the reservoir 40 is connected to the poppet 50 and provided to open the valve 50, by lifting the poppet away from the valve seat 52, and thus opening the flow path from the reservoir to the outlet port, when a predetermined pressure is reached due to the water in the reservoir 40. A handle 70 may also be provided to allow a user to manually open and close the valve. In a conventional assembly, the valve is actuated or opened by the force of a head of water in the reservoir, which will usually need to be several inches of water. When the head of water creates sufficient hydrostatic pressure in the reservoir, the diaphragm 70 is pushed upwards (direction A) by that pressure, thus lifting the poppet 50 in the same direction away from the valve seat 52. When the valve is open, a pressure differential between the inlet port 20 (which may be subjected to cabin pressure and hydrostatic pressure) and the outlet port 30 (which may be connected to the waste line or drain mast) causes the water to flow from the inlet port to the outlet port. In many applications, e.g. in aircraft, especially during flight, the pressures on the system at the inlet and the outlet will vary. At flight altitude, where a high negative pressure (vacuum force) is acting at the outlet port, a very high opening force will be required to open the valve. it would be very difficult, if not impossible to overcome the force from the pressure differential, to open the valve, with a relatively small head of water (a few inches) unless a much larger diaphragm were used. A larger diaphragm or a much larger head of water means a greater valve size would be required to open the valve.

The inventors have previously proposed a normally-closed pressure balanced poppet that allows the valve to open over different pressure conditions within a confined space. Whilst this is an improvement on existing drain valves, there is still a limit to the opening force that can be exerted by the level of water that can feasibly be collected in the valve, due to space restrictions. For a typical aircraft toilet, the drain valve would have a maximum head of water acting on the diaphragm of around 3 inches (10 cm) which may not be sufficient to open the valve in certain conditions.

There is, therefore, a need for a drain valve that can open more reliably at a wider range of pressures without having to take up a larger space to create a larger column of water to act on the diaphragm.

To address this problem, as shown by way of example on the right-hand side of FIG. 1, the present invention provides a normally-closed drain valve 305 between the toilet bowl overflow 306 and the waste line from the flush valve 304. The toilet is otherwise essentially the same as the known system described above and has a toilet bowl 300, a flush switch 303, a rinse fluid reservoir 301, a rinse valve 302 and a flush valve 304 which may, in the same way as described above, be connected to a waste tank 200.

The valve assembly of the disclosure will be described in more detail with reference to the example shown in FIGS. 3A, 3B and 3C.

As with the conventional assembly, the valve is arranged in a housing 400 having a first, lower (or 'wet') section 410 and a second, upper (or 'dry') section 420. The lower section 410 has an inlet port 500 arranged to be fluidly connected to a supply of water; in this case to the toilet overflow. The housing also has an outlet port 600 arranged in the bottom of the housing and configured to be fluidly connected to a waste pipe (not shown). In the open state, fluid flows from the inlet port 500 to the outlet port 600 through the valve housing due to a pressure differential between the inlet and the outlet, as described above. When the valve is closed (which is its default state) water from the inlet port 500 collects in a collection chamber 700 in the lower section of the valve housing and is prevented from flowing through the outlet port 600 by means of a poppet valve 800 that is configured to sit in a valve seat 820 across the outlet port 600. The poppet valve 800 extends through the upper and lower sections of the valve assembly. A seal 900 is provided between a first end 801 of the poppet and the valve seat to prevent leakage from the chamber 700 when the valve is closed. A further seal 910 is provided around a flange 805 of the poppet valve located in a section of the housing between the upper and the lower section to fluidly seal the lower (wet) section 410 from the upper (dry) section 420. An upper seal 920 seals the poppet valve relative to the top of the housing at the upper section. A check valve 180 may be provided in the outlet port 600 to prevent backflow into the collection chamber 700 when the valve is open. A handle 170 may be provided, attached to the poppet, to allow a user to override automatic operation of the valve and to manually open and/or close the valve.

The poppet 800 of the valve assembly of this disclosure is designed as a pressure-balancing poppet in that it is formed as a hollow poppet body so defining a pressure balancing channel 850 down the middle of the poppet 800 between the first end 801 and a second end 802. The housing 400 is shaped to define a cavity 810 above the open second end 802 of the poppet. The poppet therefore sits in the housing with its first end 801 in the valve seat of the outlet and its second end extending into the cavity formed on the top of the housing. The poppet is held in place by the forces acting on it and is, therefore, a floating poppet. The diameter A of the first end 801 is equal to the diameter B of the second end to provide the required pressure balance.

The upper 'dry' section 420 of the valve assembly, within the housing, is separated from the water collection chamber by the seal 910. A diaphragm 160 is provided spanning the housing in this section and fixed to the poppet valve in the dry section.

The operation of the valve assembly will be described further below.

Figure 3A:
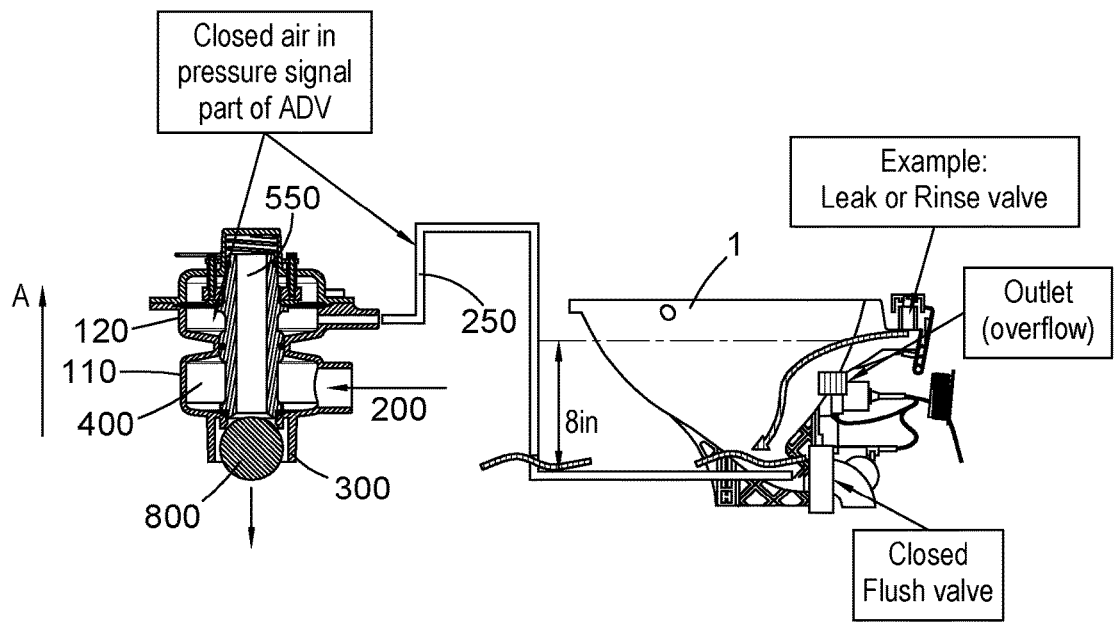
FIG. 3A is a cross-section of a drain valve assembly according to the disclosure in its normally-closed state, as connected to a vacuum toilet.
Figure 3B:
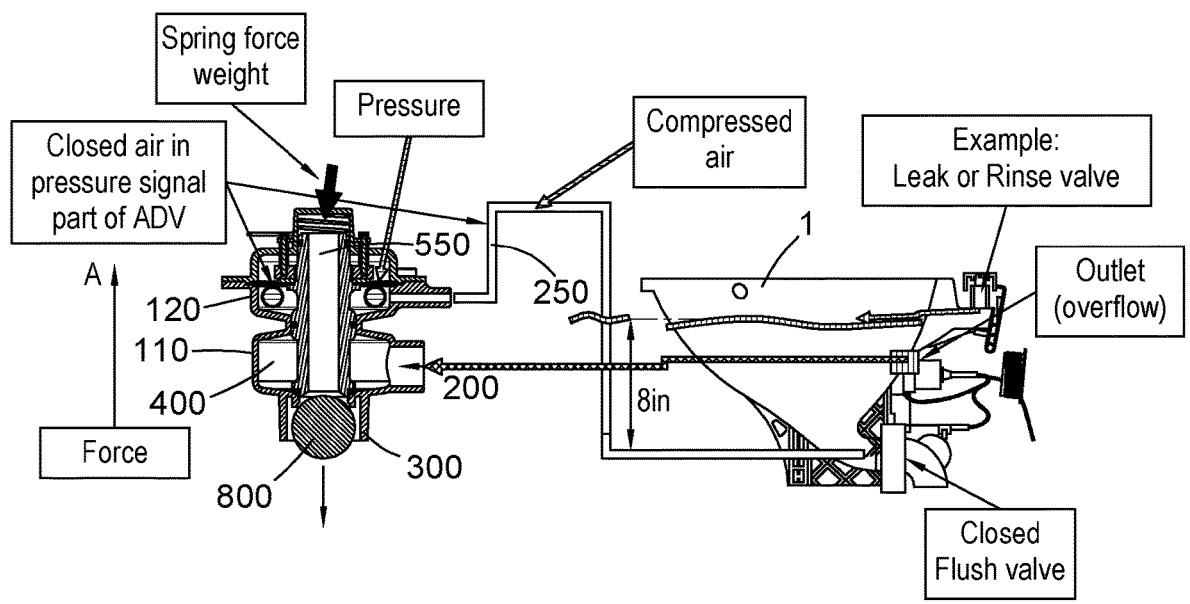
FIG. 3B is a cross-section of a drain valve assembly according to the disclosure in its open state as connected to a vacuum toilet.
Figure 3C:
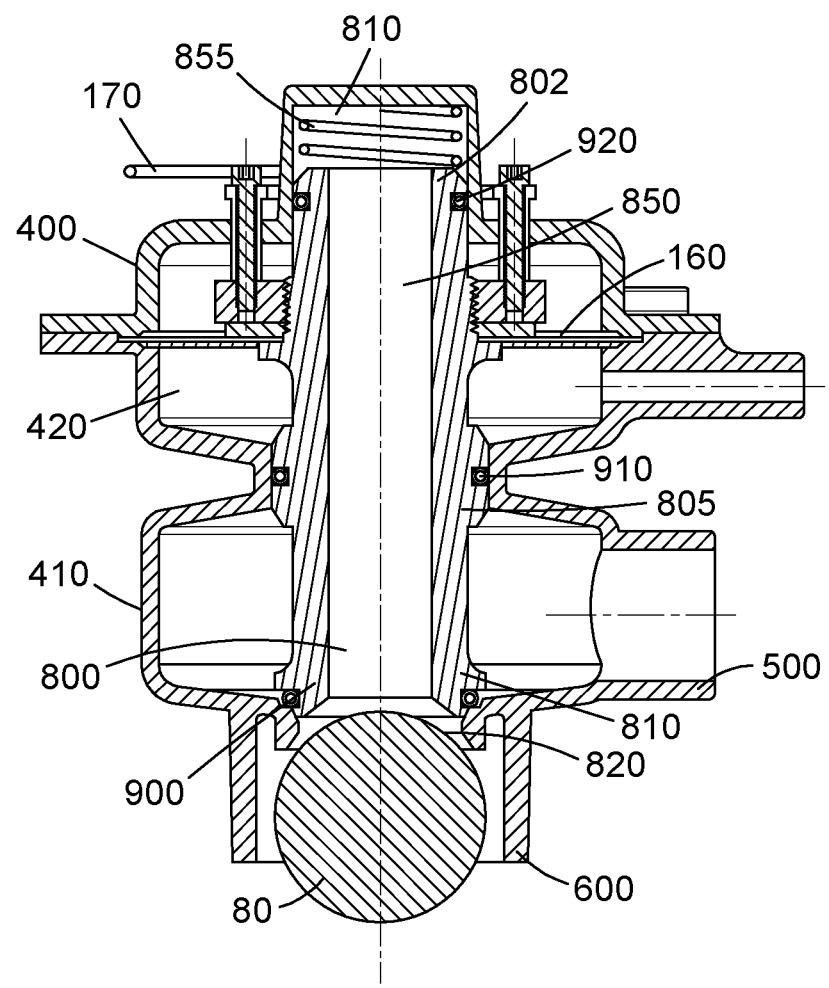
FIG. 3C is a simple cross-section view of a drain valve according to the disclosure.

The valve is designed to be a normally-closed valve and so, under normal operating conditions, as shown in FIG. 3A, when a pressure differential is applied, the poppet sits in the valve seat, in sealing engagement therewith. Any water coming from the inlet port 500 is collected in the collection chamber 700. To drain the water from the collection chamber to the outlet port, the poppet needs to be lifted (in direction A) away from the valve seat so that the collected water flows from the chamber to the outlet and water from the inlet also flows to the outlet, due to the pressure difference. The valve can be opened manually by a user operating (lifting) the handle 70 that is attached to the poppet. The valve is also arranged to open automatically as described below.

As with the conventional system of FIG. 2, the poppet 800 is attached to a diaphragm 60 across the top of the valve assembly in the upper section 420. When the pressure in the collection chamber 700 exceeds a first predetermined opening pressure, this will push against the flange 805 thus pushing the poppet valve upwards relative to the valve seat (i.e. the end 802 moving upwards into the cavity 810) (direction A) thus lifting the poppet away from the valve seat and opening the outlet port.

As mentioned above, though, the height of water that can be established in the chamber 700 might create insufficient pressure to lift the poppet away from the seat depending on the pressure acting on the other side of the valve. An increased opening force can only be created by increasing the height of the chamber, which is not always feasible when space is limited. According to this disclosure, therefore, a separate pressure signal 250 is provided to the upper 'dry' section from the system e.g. from the toilet bowl in which the level of water is to be monitored. This pressure signal is generated by water accumulated in the site to be monitored e.g. the toilet bowl. This pressure signal acts on the chamber side of the diaphragm 160 and when this exceeds a second predetermined pressure, causes the diaphragm to deform in the upwards (A) direction thus drawing the poppet 800, to which it is attached, upwards in direction A to open the drain valve. This independent pressure signal 250, described further below, from the water accumulated in the e.g. toilet bowl 1 results in a pressure acting to open the valve assembly that equates to a higher column of water h than the existing assembly (e.g. can equate to about 8 inches (about 25 cm) of water.

The pressure signal 250 is provided to the drain valve via pressure signal line 255 which is an air-filled fluid conduit connected between the bottom of the toilet bowl 300 at the level of the flush valve 304 and the dry section 420 of the valve.

As mentioned above, FIG. 3A shows the valve in its normally-closed position. The valve will be in this position when there is no water in the toilet bowl or when the level of water in the toilet bowl is low. In this case, where the level of water WL is low relative to the flood plane FP in the toilet bowl 300, the water level in the pressure signal line 255 will be at the same height (PL). The dimensions of the conduit are such that the pressure of the air in the conduit when the water is at level WL is not sufficient to open the valve and the valve is only controlled via the inlet overflow as described above. The valve will usually, therefore, stay closed.

In the even that the toilet bowl 300 fills, as described above, as shown in FIG. 3B, e.g. due to a leaky rinse valve 302, the level of water in the bowl will rise—here to WH—. The pressure of the water in the bowl will be passed onto the valve in the usual way, as described above, via the valve inlet port 500. As mentioned above, though, particularly where a relatively small head of water is available, this may not be enough to open the valve. In addition, according to this invention, the level of water in the pressure signal line 255 will also rise to level PH. This then compresses the air in the remainder of the conduit and the pressure of the compressed air provides the pressure signal 250 to the dry part 420 of the valve to cause the valve to open when water has reached the flood plan FP.

Due to the hollow design of the poppet, when a negative pressure is applied e.g. during flight, the negative pressure at the outlet port, pulling the poppet down into the seat 820, a negative pressure in the cavity 810 is also acting on the poppet in the opposite direction in the cavity 810. Thus, pressure on both sides of the poppet 800 is equalized and the negative pressure has no impact on the opening force of the valve. Whatever the ambient conditions, the opening force to raise the diaphragm will be the same.

In one example, to provide additional force to place the poppet in the closed position, if the weight of the hollow poppet is not enough to retain the normally closed position during normal operation, a spring 855 may be provided in the cavity 810 to bias the poppet downwards. The opening force will then need to take into account the spring force.

The seal 900 is preferably a seal designed for low pressure applications. Because the assembly does not rely on a large water head, the seals will be prone to low forces. The seal should be such as to provide little resistance to forces acting to open the valve. The seal may be e.g. a solid O-ring, a hollow O-ring, an x-ring, a flat gasket or other type of low pressure seal.

The valve assembly of this disclosure is able to operate over a wide range of differential pressures without the need for an excessively large head of water and so can be used where space is limited. The design can be easily adjusted to be retro-fitted to existing water systems and also finds use in new applications such as for toilet overflow protection where, previously, the large head of water required for opening made such drain valve unfeasible.

In addition, the valve assembly has separate wet and dry sections and so the diaphragm, being located in the dry section, will not be in contact with the waste (e.g. dark) water from e.g. a toilet bowl.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A toilet system comprising:
a toilet; and
a drain valve assembly for draining waste water from a toilet bowl,
the drain valve assembly comprising:
a valve housing having an upper section and a lower section,
the lower section comprising an inlet port, an outlet port and a water collection chamber between the inlet port and the outlet port,
the upper section including a pressure diaphragm across the upper section;
a poppet valve positioned in the housing and extending between the lower section and the upper section,
the poppet valve arranged to fluidly seal the lower section from the upper section, the poppet valve in the water collection chamber being arranged to be normally sealingly positioned across the outlet port to prevent water exiting the water collection chamber to the outlet port,
the poppet valve attached to the pressure diaphragm in the upper section, the drain valve assembly further comprising a pressure line for providing a pressure signal to the upper section such that when the pressure from the pressure line in the upper section exceeds a predetermined opening pressure it causes the pressure diaphragm to lift and to thus lift the poppet out of sealing engagement across the outlet port such that water can drain to the outlet port from the water collection chamber;
wherein the poppet valve has a hollow body defining a channel from a first end of the poppet valve, adjacent the outlet, and a second end of the poppet valve adjacent the pressure diaphragm, and
wherein the housing defines a vacuum cavity across the second end of the channel, such that a negative pressure acting on one end of the poppet valve is balanced by a negative pressure acting in the opposite direction at the other end;
wherein the pressure line is an air-filled fluid conduit fluidly connected between a bottom of the toilet bowl and the upper section of the valve housing such that water flows from the toilet bowl into the conduit such that when the level of water in the toilet bowl is at a predetermined flood plane level, the level of water in the conduit is such as to compress the air in the conduit to a pressure sufficient to open the poppet valve.

2. A toilet system as claimed in claim 1, being a toilet system in an aircraft.

3. The toilet system of claim 1, where the cross-sectional diameter of the first end of the poppet valve is equal to the cross-sectional diameter of the second end.

4. The toilet system of claim 1, wherein the drain valve assembly further includes:
a valve seat formed in the outlet port to receive the first end of the poppet valve.

5. The toilet system of claim 1, wherein the drain valve assembly further includes:
a seal at the first end of the poppet valve to ensure sealing engagement with the outlet port.

6. The toilet system of claim 1, wherein the seal is a low pressure seal.

7. The toilet system of claim 1, wherein the seal is one of a solid O-ring, a hollow O-ring, and x-ring or a flat gasket.

8. The toilet system of claim 1, wherein the drain valve assembly further includes:
a check valve located downstream of the outlet port to prevent backflow into the water collection chamber.

9. The toilet system of claim 1,
wherein the inlet port is configured to be connected to toilet overflow slot and the outlet port is configured to be connected to a drain pipe.

10. The toilet system of claim 1, wherein the drain valve assembly further includes:
a spring between the second end of the poppet valve and the cavity to bias the poppet valve to be seated at the outlet port.

11. The toilet system of claim 1, wherein the drain valve assembly further includes:
a handle attached to the poppet valve to allow a user to manually open and close the poppet valve.

12. A toilet system comprising:
a toilet; and
a drain valve assembly for draining overflow water from the toilet;
the drain valve assembly comprising:
a valve housing having an upper section and a lower section,
the lower section comprising an inlet port, an outlet port and a water collection chamber between the inlet port and the outlet port,
the upper section including a pressure diaphragm across the upper section;
a poppet valve positioned in the housing and extending between the lower section and the upper section,
the poppet valve arranged to fluidly seal the lower section from the upper section, the poppet valve in the water collection chamber being arranged to be normally sealingly positioned across the outlet port to prevent water exiting the water collection chamber to the outlet port,
the poppet valve attached to the pressure diaphragm in the upper section, the drain valve assembly further comprising a pressure line for providing a pressure signal to the upper section such that when the pressure from the pressure line in the upper section exceeds a predetermined opening pressure it causes the pressure diaphragm to lift and to thus lift the poppet out of sealing engagement across the outlet port such that water can drain to the outlet port from the water collection chamber;

wherein the poppet valve has a hollow body defining a channel from a first end of the poppet valve, adjacent the outlet, and a second end of the poppet valve adjacent the pressure diaphragm, and wherein the housing defines a vacuum cavity across the second end of the channel, such that a negative pressure acting on one end of the poppet valve is balanced by a negative pressure acting in the opposite direction at the other end.

13. A toilet system as claimed in claim 12, being a toilet system in an aircraft.

\* \* \* \* \*